(12) United States Patent
Herberg et al.

(10) Patent No.: US 7,900,973 B2
(45) Date of Patent: Mar. 8, 2011

(54) PLUG-TYPE CONNECTOR

(75) Inventors: Tom Herberg, Guttau (DE); Bernd Kaimer, Dusseldorf (DE)

(73) Assignee: Kaimer GmbH & Co. Holding KG, Essen (DE)

( * ) Notice: Subject to any disclaimer, the term of this patent is extended or adjusted under 35 U.S.C. 154(b) by 407 days.

(21) Appl. No.: 11/693,987

(22) Filed: Mar. 30, 2007

(65) Prior Publication Data

US 2007/0232147 A1 Oct. 4, 2007

(30) Foreign Application Priority Data

Mar. 30, 2006 (DE) .......................... 10 2006 015 158

(51) Int. Cl.
*F16L 35/00* (2006.01)

(52) U.S. Cl. ......... 285/331; 285/104; 285/113; 285/306; 285/307; 285/340

(58) Field of Classification Search .................. 285/104, 285/113, 331, 83, 306, 307, 339, 340, 342, 285/343, 345, 346, 350
See application file for complete search history.

(56) References Cited

U.S. PATENT DOCUMENTS

| | | | | |
|---|---|---|---|---|
| 2,449,795 A * | 9/1948 | Stillwagon | ..................... | 285/104 |
| 3,874,709 A * | 4/1975 | MacDonald | ................... | 285/104 |
| 4,302,036 A * | 11/1981 | Burge | ........................... | 285/323 |
| 4,330,143 A * | 5/1982 | Reneau | ......................... | 285/343 |
| 5,348,354 A | 9/1994 | Badoureaux | | |
| 5,393,107 A * | 2/1995 | Vobeck | ......................... | 285/322 |
| 6,578,879 B2 | 6/2003 | Muto | | |
| 6,688,652 B2 * | 2/2004 | Holmes et al. | ................ | 285/104 |
| 6,893,051 B1 * | 5/2005 | Park et al. | ...................... | 285/104 |
| 6,908,120 B2 * | 6/2005 | Tomita et al. | ................. | 285/340 |
| 7,380,838 B2 * | 6/2008 | Paluncic | ....................... | 285/323 |
| 2002/0163191 A1 * | 11/2002 | Muenster et al. | ............. | 285/331 |
| 2005/0012328 A1 * | 1/2005 | Baving et al. | ................. | 285/242 |
| 2005/0035597 A1 | 2/2005 | Bamberger et al. | | |
| 2006/0108802 A1 * | 5/2006 | Baumgartner | ................ | 285/322 |

FOREIGN PATENT DOCUMENTS

| | | |
|---|---|---|
| DE | 29706377 | 7/1997 |
| DE | 19654435 | 7/1998 |
| DE | 19854854 | 5/2000 |
| DE | 10114326 | 10/2002 |

(Continued)

OTHER PUBLICATIONS

Delphion print-out dated Jun. 11, 2007, related to reference DE 29706377, 1 pg.

*Primary Examiner* — Daniel P Stodola
*Assistant Examiner* — Robert Williams
(74) *Attorney, Agent, or Firm* — Grossman Tucker Perreault & Pfleger, PLLC

(57) ABSTRACT

A plug-type connector for pipelines, having a first and a second connection end, with a first connection end being in the form of a first support body, the first support body being provided with a closure ring, the closure ring and the first support body forming an annular space for accommodating a pipe end, and for securing the pipe end, which is inserted into the annular space in a clamping manner, against axially acting withdrawal forces. The plug-type connector is distinguished in that the closure ring has at least one latching projection or latching recess with which the clamping ring can be axially secured.

1 Claim, 5 Drawing Sheets

FOREIGN PATENT DOCUMENTS

Figure 1:
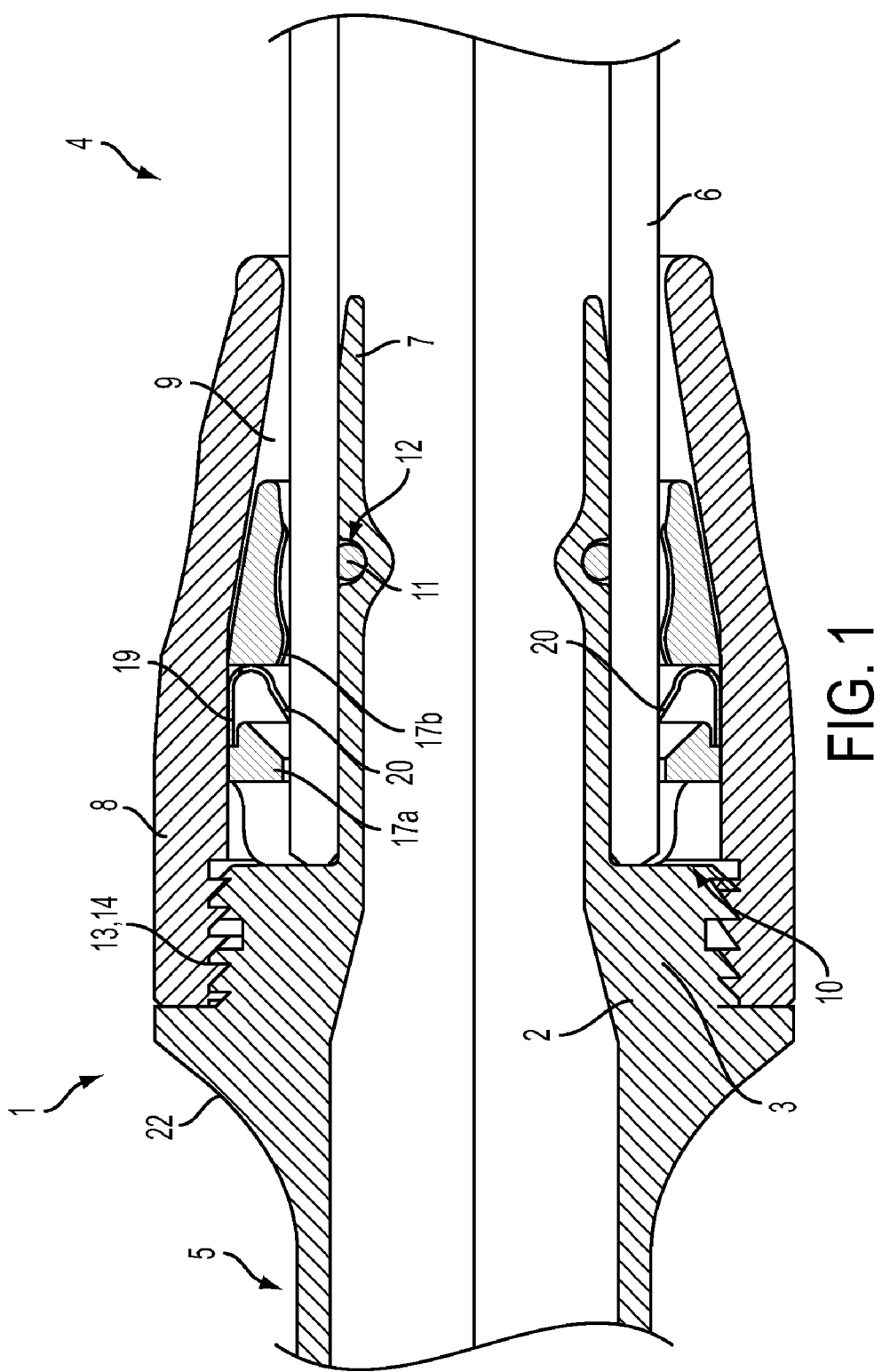

| | | |
|---|---|---|
| DE | 69920059 | 9/2005 |
| EP | 0506586 | 9/1992 |
| EP | 0879984 | 11/1998 |
| FR | 2665508 | 2/1992 |
| GB | 2174468 | 11/1986 |
| RU | 2277666 | 5/2005 |
| WO | WO2004104466 | 12/2004 |

* cited by examiner

PLUG-TYPE CONNECTOR

The invention relates to a plug-type connector for pipelines, having a first and a second connection end, with a first connection end being in the form of a first support body, the first support body being provided with a closure ring, the closure ring and the first support body forming an annular space for accommodating a pipe end, and means being provided for securing the pipe end, which is inserted into the annular space, in a clamping manner against axially acting withdrawal forces.

A plug-type connector of this type is known, for example from DE 20 2005 004 524 U1. Said document describes a plug-type connector having a support body, a fixing part for fixing a free end of a pipeline to the support body and a claw ring which is arranged within the fixing part and, on its inner face, has inner claws for engaging in the outer face of the pipeline. This plug-type connector has two connection ends, of which one connection end is designed for the insertion of the end of a pipeline. That connection end of the plug-type connector which is situated opposite the insertion end likewise accommodates a tubular body, for example a fitting body which, at its free end, has an annular flange for the purpose of locking within the plug-type connector in an interlocking manner.

Plug-type connectors of this type, as also described in DE 20 2005 004 524 U1 for example, are used particularly for hot- and cold-water lines in the domestic sanitary and heating sector where it is desirable to quickly and simply connect pipelines to branches. Plug-type connectors of this type are often provided on floor-heating distributors, where the plug-type connectors accommodate plastic pipes of the individual heating circuits.

An arrangement of this type for connecting fluid lines is, for example, known from European Patent Application EP 1 099 896 A2.

The known plug-type connectors are usually formed in such a way that one end can accommodate a smooth-walled pipeline in the form of a plastic pipe or in the form of a plastic/metal composite pipe, whereas the other connection end, as is also provided in DE 20 2005 004 524 U1, accommodates a pipe connection part which is suitable for the plug-type connector.

This presents no problems in this respect when applied to heating circuit distributors.

To date, no satisfactory solutions which allow particularly simple and rapid assembly have been disclosed for connecting different pipeline systems to one another, for example for connecting metal pipes on the one hand and plastic or plastic/metal composite pipes on the other In order to connect such pipe systems, adapters are used which are formed with plug-type ends on both sides, with each plug-type end being connected to the line section in question by means of a press fitting. The plug-type ends are designed for the different diameters and/or the different properties of the pipe ends to be pressed.

Plug-type adapters of this kind are used, for example, in the field of domestic fresh-water supply, for example where story distribution systems of a house with several stories are connected to the riser lines. At the present time, the story distribution systems are often in the form of plastic pipes which comprise riser lines which are often composed of metal or of plastic/metal composite pipes.

Pressing the connection on both sides is relatively time-consuming.

The object of the invention is therefore to improve a plug-type connector for pipelines of the kind mentioned in the introduction, particularly with regard to the field of use.

A further object of the invention is to improve a plug-type connector of the kind mentioned in the introduction in terms of the quality of the clamping connection, with the particular intention being to ensure that the free end of the inserted pipeline is pressed against the support body with as constant a contact pressure as possible.

The object is firstly achieved by a plug-type connector for pipelines, having a first and a second connection end, with a first connection end being in the form of a first support body, the first support body being provided with a closure ring, the closure ring and the first support body forming an annular space for accommodating a pipe end, and means being provided for securing the pipe end, which is inserted into the annular space, in a clamping manner against axially acting withdrawal forces. The plug-type connector according to the invention is distinguished in that a second connection end is designed to be press-connected to a plug-in end of a metal pipe or to a plug socket, which is widened in the manner of a bushing, of a metal pipe or to a metal press fitting.

A plug-type connector of this kind has the advantage that it can readily be used as an adapter between different pipeline systems, there being no need for special matching of the pipelines which are to be connected since the plug-type connector according to the invention has a connection end, which is provided for pressing purposes, and a plug-type end. In particular, the design of one end of the adapter according to the invention as a plug-type connector considerably simplifies and reduces the time needed for assembly of the pipeline.

In one preferred variant of the plug-type connector according to the invention, it is provided that the second connection end is in the form of a second support body which forms an integral base body with the first support body.

As an alternative to this, it may be provided that the second connection end is in the form of a pressing sleeve which forms an integral base body with the first support body.

The base body is expediently composed of metal, preferably of brass, stainless steel or gunmetal.

In one expedient variant of the plug-type connector according to the invention, the base body has a circumferential collar which accommodates the closure ring and serves as an insertion-limiting stop for at least the first connection end. At the second connection end which is in the form of a support body, this collar may, for example, also serve as an insertion-limiting stop for the second support body.

The closure ring can be screwed or locked to the base body.

If the closure ring is screwed to the base body, it is expedient it the closure ring has a union nut connection which at least partially surrounds the circumferential collar of the base body.

By way of example, at least one claw ring and at least one clamping ring which interact with the casing surface of the inserted pipe end may be provided as means for securing the pipe end, which is inserted into the first connection end, in a clamping manner.

The object is also achieved by a plug-type connector for pipelines, having a first and a second connection end, with a first connection end being in the form of a first support body, with the first support body being provided with a closure ring, the closure ring and the first support body forming an annular space for accommodating a pipe end, with at least one claw ring and at least one clamping ring being provided for securing the pipe end, which is inserted into the annular space, in a clamping manner against axially acting withdrawal forces, and with the plug-type connector being distinguished in that the clamping ring can be axially displaced with respect to the closure ring, and in that the closure ring has at least one latching projection or latching recess with which the clamping ring can be axially secured when said clamping ring is displaced in the axial direction on account of withdrawal forces acting on the pipe end.

The clamping ring is therefore axially secured when it is drawn into the conically running annular gap between the closure ring and the casing surface of the inserted pipe end.

The closure ring preferably has an inner circumferential step which forms a recess in the withdrawal direction of the inserted pipe end, this recess acting as an axial locking means of the clamping ring with radially resilient segments of the clamping ring when said clamping ring is axially displaced in the withdrawal direction.

Securing of the clamping ring in this way has proven substantially more advantageous than the wedging of the claw ring, as known from DE 20 2005 004 524 U1 for example, which has been customary to date. Wedging of this type by means of outer claws of the claw ring has the disadvantage that said wedging may work free when the pipe connection is subjected to pressure surges.

Figure 2:
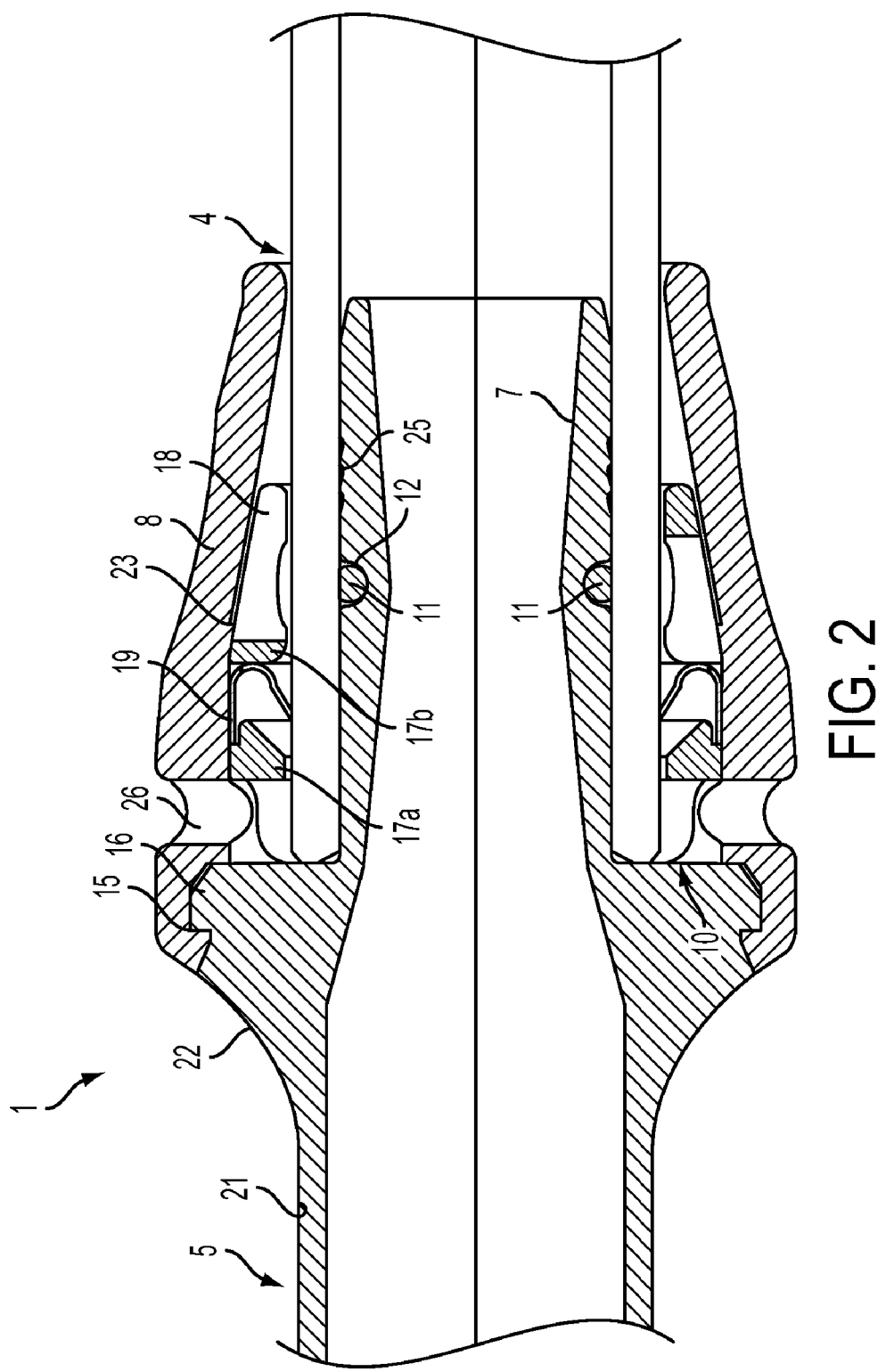
Figure 3A:
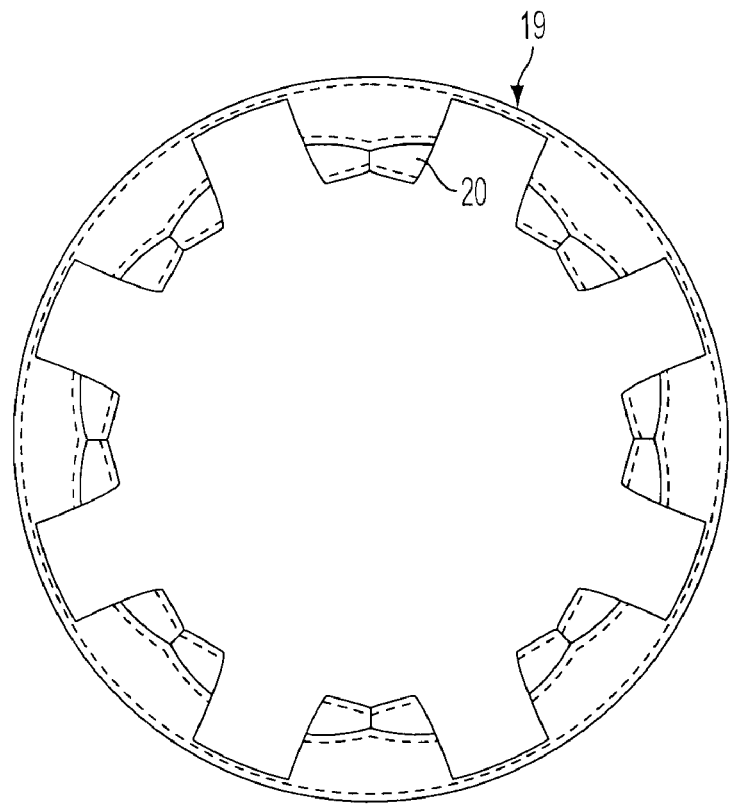
Figure 3B:
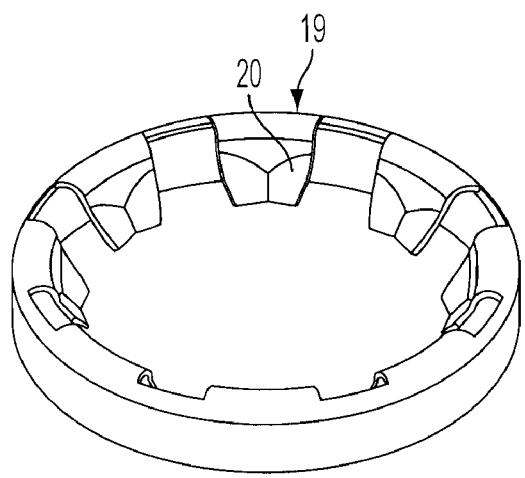
Figure 4A:
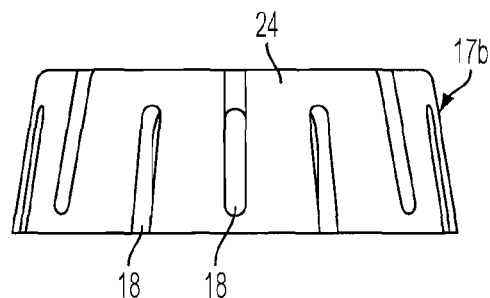
Figure 4B:
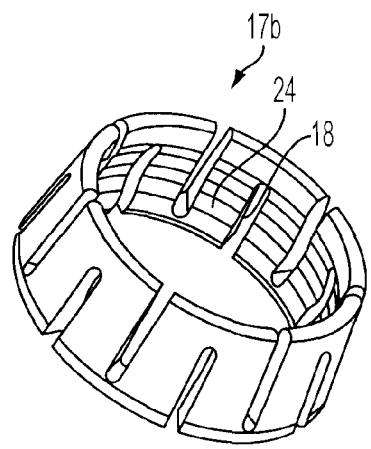
Figure 4C:
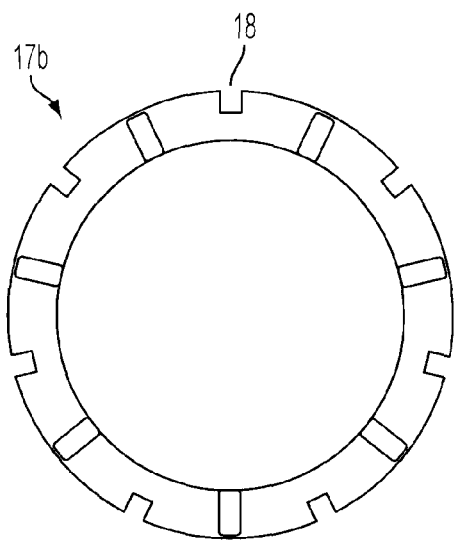
Figure 5A:
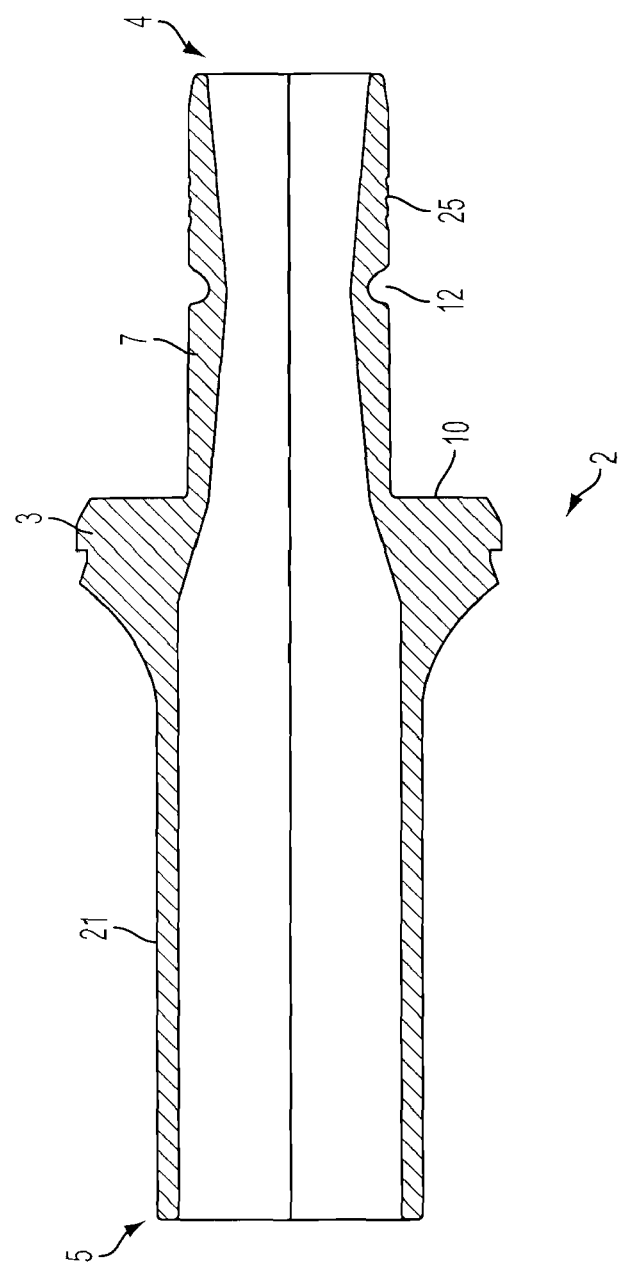
Figure 5B:
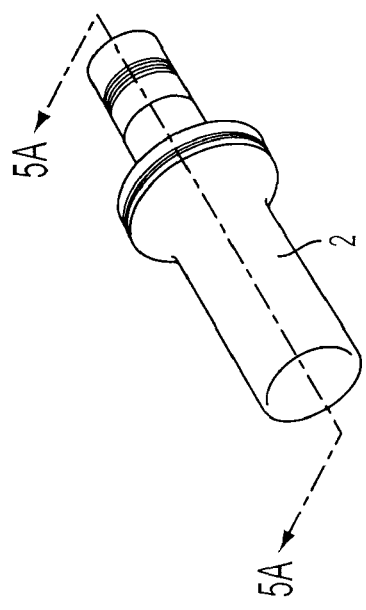

The invention is explained below with reference to an exemplary embodiment which is illustrated in the figures, in which:

FIG. 1 shows a sectional view through the plug-type connector according to the invention with a pipe section inserted into said plug-type connector, the closure ring being screwed to the base body of the plug-type connector, FIG. 2 shows an alternative refinement of the plug-type connector according to the invention, in which the closure ring is locked in the base body of the plug-type connector, FIG. 3A shows a top view of the claw ring, FIG. 3B shows a perspective view of the claw ring, FIG. 4A shows a side view of the clamping ring, FIG. 4B shows a perspective view of the clamping ring, FIG. 4C shows a top view of the clamping ring, FIG. 5A shows a cross-sectional view of the base body, and FIG. 5B shows a perspective view of the base body.

The plug-type connector 1 denoted 1 in FIGS. 1 and 2 comprises a metal base body 2 with a circumferential thickened portion which is in the form of a collar 3. The collar 3 defines approximately the middle of the base body 3, the plug-type connector 1 forms a first connection end 4 and a second connection end 5, with the first connection end 4, as described below, being in the form of a plug socket for a pipe 6.

To this end, the base body 2 forms a first support body 7 in the region of the first connection end 4, said first support body forming an annular space 9 for accommodating the pipe 6 with a closure ring 8 which surrounds said first support body.

As can be seen in FIG. 1 for example, the open end of the pipe 6 is pushed into the annular space 9 until said pipe strikes an annular flange 10 which is formed by the collar 3. The pipe 6 is secured against withdrawal forces acting axially in the opposite direction by means of the clamping mechanism which is still to be described below.

The pipe 6 is sealed off in a liquid-tight manner from the first support body 7 by means of an O-ring 11 which is accommodated by an annular groove 12 of the first support body 7.

In the example illustrated in FIG. 1, the closure ring 8 is provided with an internal thread 13 which forms a union nut connection with a threaded step 14 of the collar 3.

In the exemplary embodiment shown in FIG. 2, the clamping ring 8 is provided on its end which faces the collar 3 with an inner circumferential locking groove 15 which interacts with a correspondingly formed latching contour 16 on the outer circumference of the collar 3.

In both cases, a clamping ring 17b is accommodated between the closure ring 8 and the first support body 7, the cross section of said clamping ring being approximately conical and being matched approximately to the cross-sectional contour of the annular space 9 which tapers in the direction of the pipe 6.

The clamping ring 17b is provided with slots 18 which extend in the longitudinal direction and, in a known manner, allow said clamping ring to be deformed in the radial direction. 19 denotes a claw ring which is inserted between a spacer ring 17a and the clamping ring 17b. The claw ring 19 has spring claws 20 which are directed radially inwards and, in a known manner, latch into the casing surface of the pipe 6 and counteract the withdrawal force when the pipe 6 is withdrawn from the annular space 9.

It is obvious to a person skilled in the art that the spacer ring 17a and the clamping ring 17b may also be integrally formed.

The closure ring 8 is provided with an inner circumferential step 23 which forms a widened diameter or a recess in the closure ring 8 in the withdrawal direction of the pipe 6. When the clamping ring 17b is axially displaced in the withdrawal direction of the pipe 6 if said clamping ring is drawn into the conical annular gap between the casing surface of the pipe 6 and the closure ring 8, said circumferential step 23 causes the segments 24 of the clamping ring 17b to spring out in this region, with the result that the circumferential step 23 acts as a stop against a return movement of the clamping ring 17b counter to the withdrawal direction of the pipe 6, and the clamping ring therefore remains tensioned.

26 denotes a viewing window in the closure ring 8, this viewing window allowing the insertion depth of the pipe 6 into the annular gap 9 to be visually monitored.

Furthermore, the casing surface of the first support body 7 is provided with circumferential ribs 25 in order to increase the withdrawal resistance of the pipe 6.

In the illustrated exemplary embodiment, the second connection end 5 of the plug-type connector 1 is in the form of a second support body 21 for insertion into a fitting which is to be connected or into a pipeline which is to be connected. An additional insertion-limiting stop may be provided on the second support body 21; however, the collar 3 may also serve as an insertion-limiting stop. Said collar does not necessarily have to be provided with a radius 22 on the outside of its side which faces the second support body 21, instead, it is possible to provide a further annular flange in place of the radius 22 provided there.

The base body 2 is preferably integrally formed from metal. The second support body 21 serves to produce a pressing connection with the pipe which is connected to the second connection end 5.

List of Reference Symbols

1 Plug-type connector
2 Base body
3 Collar
4 First connection end
5 Second connection end
6 Pipe
7 First support body
8 Closure ring
9 Annular space
10 Annular flange
11 O-ring
12 Annular groove 13 Internal thread
14 Threaded step
15 Locking groove
16 Locking contour
17a Spacer ring
17b Clamping ring
18 Slots
19 Claw ring
20 Spring claws
21 Second support body
22 Radius
23 Step
24 Segments
25 Ribs
26 Viewing window

The invention claimed is:

1. Connector for pipelines, having a first and a second connection end, with the first connection end in the form of a base body including a first support body, the support body provided with a closure ring which is directly attached to the base body, the closure ring and the support body forming an annular space for the insertion or withdrawal of a pipe end, with at least one claw ring and at least one clamping ring provided to secure the pipe end, which is inserted into the annular space in a direction towards said base body, in a clamping manner against axially acting withdrawal forces, characterized in that the clamping ring includes resilient segments and can be axially displaced with respect to the closure ring, and in that the closure ring is provided with an inner circumferential step with which the clamping ring is axially secured, the step defining a recess in a withdrawal direction of the pipe away from said base body, further characterized in that upon axial displacement of the clamping ring in the withdrawal direction of the pipe away from said base body the clamping ring is drawn into the recess, and said circumferential step causes the resilient segments of the clamping ring to spring out into the recess, and wherein upon withdrawal, the inner circumferential step adjoining the clamping ring provides a stop for said resilient segments of said clamping ring against a return movement of the clamping ring counter to the withdrawal direction.

* * * * *